Dec. 16, 1924.

L. TEAL 1,519,562

NEWSPAPER ASSEMBLING METHOD AND MECHANISM

Original Filed Aug. 5, 1921    5 Sheets-Sheet 1

INVENTOR
*Louis Teal*
BY
*Butler & Denny*
ATTORNEY

Dec. 16, 1924.

L. TEAL 1,519,562

NEWSPAPER ASSEMBLING METHOD AND MECHANISM

Original Filed Aug. 5, 1921    5 Sheets-Sheet 4

INVENTOR
Louis Teal
BY
Butler & Denny
ATTORNEY

Dec. 16, 1924.
L. TEAL
1,519,562
NEWSPAPER ASSEMBLING METHOD AND MECHANISM
Original Filed Aug. 5, 1921    5 Sheets-Sheet 5
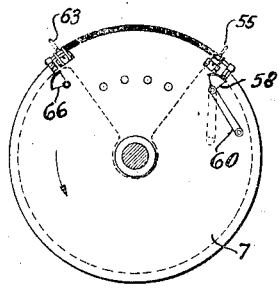
Fig. 7.
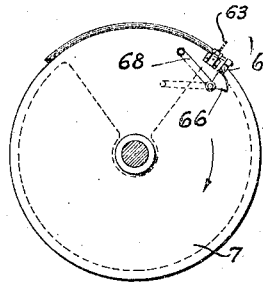
Fig. 8.
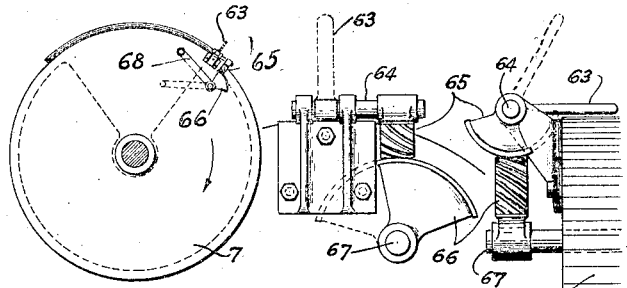
Fig. 9.    Fig. 10.
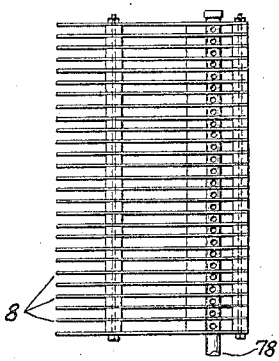
Fig. 11.
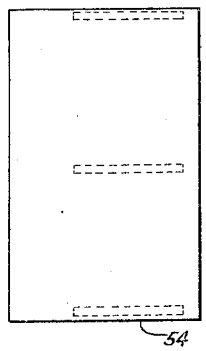
Fig. 13.
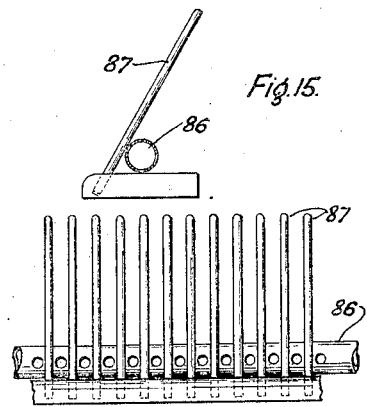
Fig. 15.
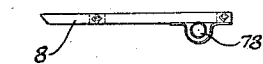
Fig. 12.
Fig. 14.
Fig. 16.
INVENTOR
Louis Teal
BY
Butler + Denny
ATTORNEY Patented Dec. 16, 1924.

1,519,562

UNITED STATES PATENT OFFICE.

LOUIS TEAL, OF LANSDOWNE, PENNSYLVANIA; THE MEDIA TITLE & TRUST COMPANY ADMINISTRATORS OF THE ESTATE OF THE SAID LOUIS TEAL, DECEASED.

NEWSPAPER-ASSEMBLING METHOD AND MECHANISM.

Application filed August 5, 1921, Serial No. 490,016. Renewed October 3, 1924.

*To all whom it may concern:*

Be it known that I, LOUIS TEAL, a citizen of the United States, residing at Lansdowne, in the county of Delaware and State of Pennsylvania, have invented a new and useful Newspaper-Assembling Method and Mechanism, of which the following is a specification.

This invention is a method and mechanism designed primarily for facilitating the assemblage of newspapers by translating, opening and closing a fold of the outer section of each copy in regular succession and delivering a filling section between the separated folds of the outer section in timed relation, simply, automatically and efficiently. While the primary purpose of the invention is to assemble newspapers by inserting a filling section or sections between the secondary folds of the outer section, it is to be understood that it may be used for inserting filling sheets within the folds of outer sheets or sections generally.

The characteristic features of the invention are embodied in the method and mechanism set out in the following description and in the accompanying drawings in illustration thereof.

Figure 1:
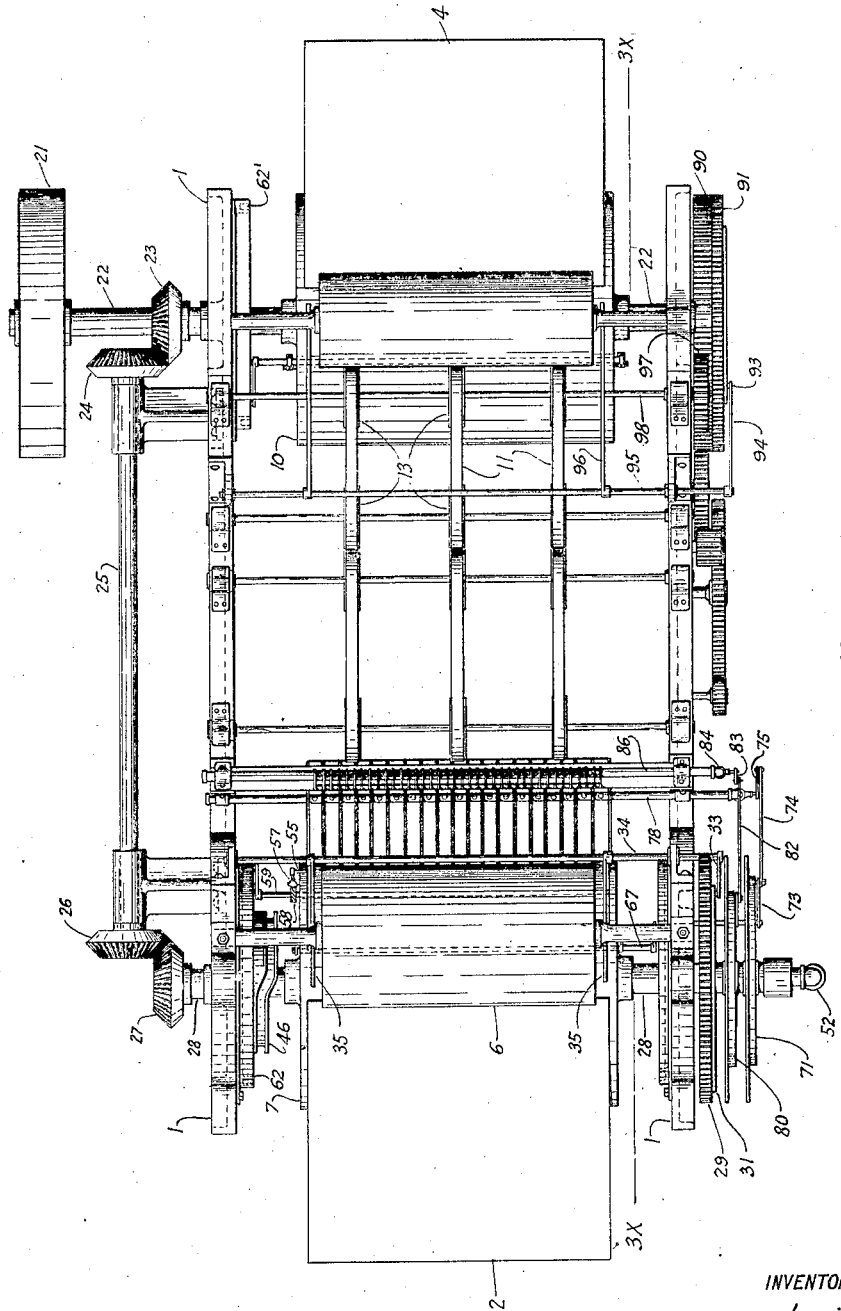
Figure 2:
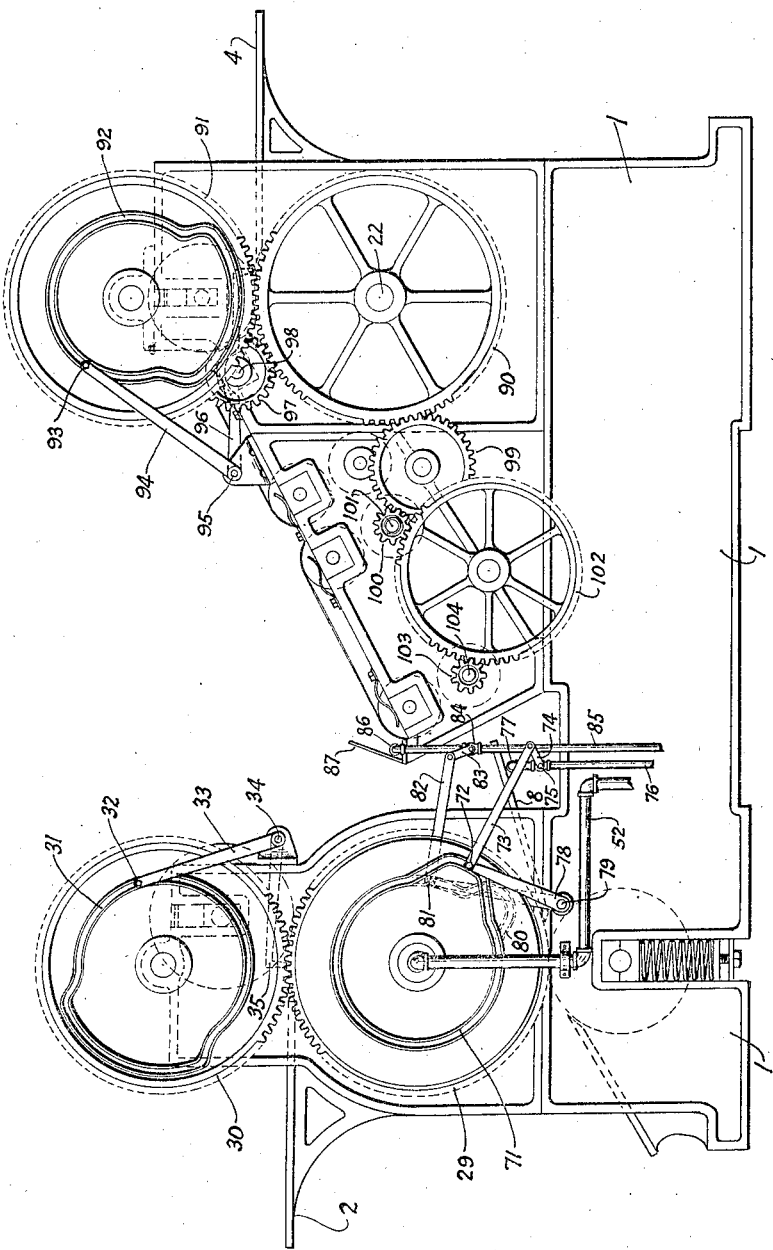
Figure 3:
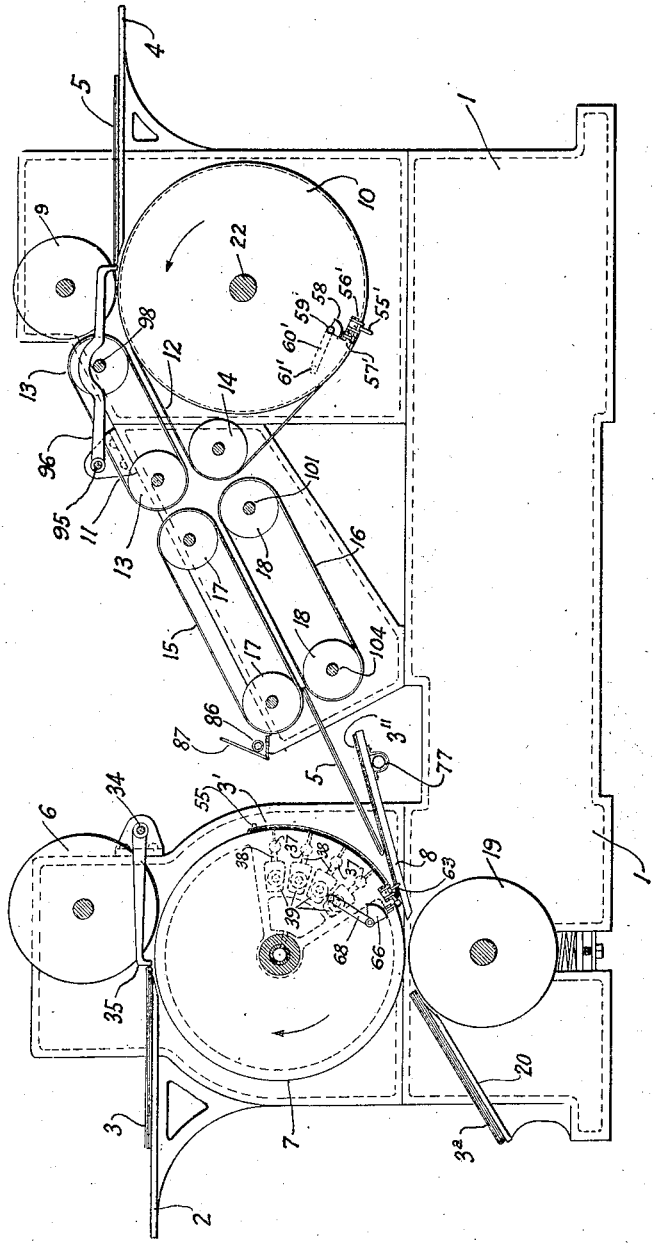
Figure 4:
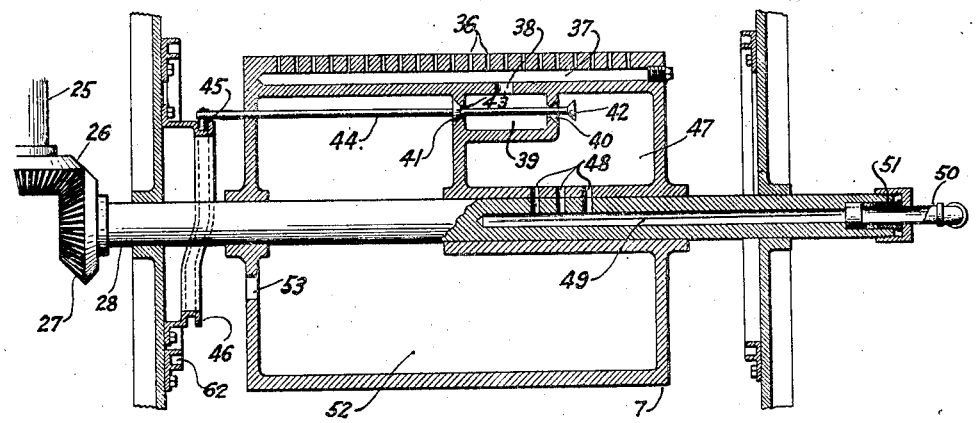
Figure 5:
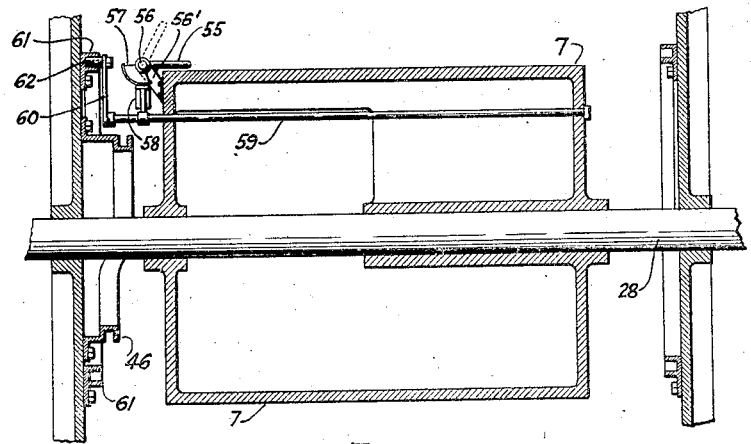
Figure 6:
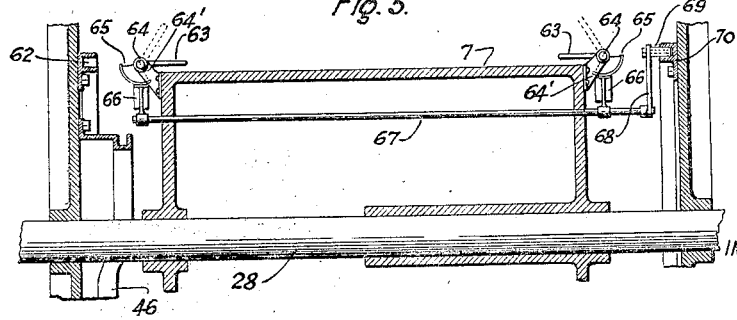

In the drawings, Fig. 1 is a plan view of a machine comprised in my invention; Fig. 2 is a side elevation of the same; Fig. 3 is a longitudinal sectional view taken on the line 3×—3× of Fig. 1; Fig. 4 is a broken sectional view taken horizontally through the axis of the pneumatic cylinder for carrying the outer sheet or sheets and opening them in position for receiving the filling sheets; Fig. 5 is a broken sectional view taken axially through the same cylinder in illustration of gripper mechanism for engaging thereto a corner of the sheets forming one of the secondary folds; Fig. 6 is a broken sectional view taken through the axis of the same cylinder in illustration of further gripping mechanisms for holding to the cylinder the forward corners of the outer sheets at the junction or crease between the secondary folds of the outer sheets or section; Fig. 7 is an elevation of the left end of the same cylinder; Fig. 8 is an elevation of the right end of the same cylinder viewed from the left of Fig. 5; Fig. 9 is a view on an enlarged scale showing details of the construction of the gripper mechanisms; Fig. 10 is a view of gripper mechanism details at right angles to the position illustrated in Fig. 9; Fig. 11 is a plan view of inclined parallel bars for supporting the sheets contained in the free secondary fold thrown out from the pneumatic cylinder together with vacuum mechanism for assisting in drawing said sheets down upon the bars so as to properly form the bight for receiving the filling or "stuffing" sheets; Fig. 12 is a part sectional end view of the construction illustrated in Fig. 11; Fig. 13 is a plan and Fig. 14 is an end view of a board for covering the construction of Fig. 11 when for any reason this vacuum mechanism is not required for the operation; Fig. 15 is a part sectional end view of pneumatic and limiting means for drawing the free secondary fold of the outer sheets away from the main cylinder under control; and Fig. 16 is a broken plan view of the construction illustrated in Fig. 15.

The machine illustrated comprises the housings 1 which support at the forward end thereof the table or feed board 2, for carrying the folded outer sheets 3 that are to be opened and filled or "stuffed," and, at the rear end, the table or feed board 4 for carrying the folded "stuffing" sheets 5 that are to be delivered between the secondary folds 3' and 3'' of the sheets 3 when opened. It will be understood that the outer section of a newspaper to be assembled has its sheets folded by a primary fold on a longitudinal line and then by a secondary fold on a line transverse thereto, which secondary fold is to be opened in the "stuffing" operation.

The folded outer section formed by the sheets 3, to be filled or "stuffed," are passed from the table 2 between the cylinders 6 and 7, to the latter of which the sheets of the inner fold 3' are engaged while those of the outer fold 3'' are separated therefrom so as to fall upon the bars 8.

The filling sheets 5 are fed from the feed board 4 between the cylinders 9 and 10 from which they are delivered between the endless carriers or belts 11 and 12, the former running over the sheaves 13 and the latter over the drum 10 and the sheaves 14. The belts 11 and 12 deliver these sheets between the more rapidly traveling belts 15 and 16 carried by the respective sheaves 17 and 18, these latter belts shooting the sheets 5 therefrom into the bight of the separated folds 3' and 3'' in timed relation to the movements of these folds. The forward movement of the cylinder 7 after the sheets 5 have been shot between the separated folds 3' and 3" carries the assembled sheets 3ª over the cylinder 19 and on to the inclined plane 20 from which such sheets are automatically delivered.

The machine is operated by a belt wheel 21 fixed on the driving shaft 22, which is journaled in the housings. A bevel-gear 23, fixed on the shaft 22, drives the bevel-gear 24 fixed on the journaled shaft 25 which has the bevel-gear 26 fixed thereon. The gear 26 engages and drives a bevel-gear 27 fixed on the shaft 28 which is journaled in the housing and has the pneumatic cylinder 7 fixed thereon.

The gear wheel 29, fixed on the shaft 28, engages the journalled gear wheel 30 which carries the cam 31. This cam has engaged therein the roller 32 of an arm 33 which is fixed on the journalled shaft 34 carrying the dogs or stops 35. These dogs are oscillated, by the mechanism described, in synchronous relation with the revolution of the cylinder 7. Thereby they are held in the lowered position to prevent the forward movement of the sheets 3 between the cylinders 6 and 7 during a predetermined period of the operation and in alternation therewith are elevated to permit such sheets to be engaged to the cylinder 7 and carried forward thereby.

The cylinder 7, to provide means for automatically engaging the sheets 3 thereto, contains sets of peripheral holes 36 communicating with respective pneumatic chambers 37 which are connected through respective passages 38 with chambers 39, the latter having the end ports 40 and 41. Poppet valves 42 and 43, fixed on reciprocating rods 44 parallel to the axis of the cylinder, are adapted for controlling these ports. The rods are provided with and operated by respective rollers 45 which run in a stationary cam way 46. Thereby the ports 40 are opened in succession as the pneumatic cylinder revolves, to permit the chambers 39 to be exhausted and, through their connections by the passages 38 with the chambers 37 and holes 36, air is exhausted through the latter as they move under the sheets 3' which are thus drawn to the cylinder. The ports 40 are closed and the ports 41 opened by this valve mechanism in the movement of the holes 36 through the lower part of their course, to effect the neutralization of the vacuum when it is desired after "stuffing" them, to release the sheets thus pneumatically engaged.

The ports 40 communicate through the cylinder chamber 47, the passages 48 and the channel 49 in the shaft 28 with the vacuum pipe 50, with which the shaft has the packed joint 51.

The ports 41 communicate with the atmosphere through the cylinder chamber 52 and the port 53 in the end thereof to neutralize the vacuum in the chambers 39, passages 38, chambers 37 and holes 36 and release the pneumatic action.

It will be understood that the vacuum units are extended so that suction shall be applied over sufficient surface to hold the sheet in contact with the cylinder in close relation thereto throughout the necessary area and, while provision is made in the form illustrated for carrying a single section or set of sheets upon the cylinder at one time, it will be understood that the mechanism may be extended to provide for carrying several sections or sets of sheets upon the cylinder at the same time.

The cylinder 7 has at the left end thereof, in the form illustrated, the gripping finger 55 carried by the shaft 56 journalled in the bearing 56' fixed to the cylinder, the shaft having fixed thereto the spiral gear segment 57. The spiral gear segment 58, fixed on the rock shaft 59 journalled in the ends of the cylinder and parallel to its axis, engages the segment 57 to rock the same and the finger 55, by which the underlying rear corner or end of the hinge of the primary fold of the section or laminated sheets carried by the cylinder, is engaged and disengaged, the engagement being effected as the outer fold moves therefrom under centrifugal influence in the downward course of the section 3. The shaft 59 has fixed thereon the arm 60 provided with the roller 61 which runs in the stationary cam way 62. Thereby the shaft 59 is rocked to oscillate the finger 55 in timed relation to the revolution of the cylinder 7 so as to engage and disengage the section or sheets carried thereby and prevent the same from being flirted away therefrom by gravity or centrifugal force, until it is desired to disengage the same.

The cylinder 7 has at its opposite ends, forward of the finger 55, the further gripping fingers 63 for engaging the ends of the crease forming the hinge between the folds or the forward corners of the sheet 3, to engage them to the cylinder as the latter carries these fingers to position therefor between the table 2 and the stops 35. These fingers are carried by the shafts 64 journalled in the bearings 64' fixed to the respective ends of the cylinder and have fixed thereto the spiral gear segments 65 engaged by spiral gear segments 66 fixed on and oscillated by the rock shaft 67 journalled in the cylinder parallel to its axis. The arm 68, fixed on the rod 67, carries the roller 69 which runs in the stationary cam way 70. Thereby the fingers 63 are rocked in synchronous relation to the revolution of the cylinder to engage the forward corners of the paper or sheets thereto through a predetermined arc of movement and to disengage the same at the end thereof.

The wheel 29 carries a cam way 71 having therein a roller 72 connected with a link 73 which operates the arm 74 of the valve 75 in the vacuum pipe 76, the latter having the perforated section 77 extending under the bars 8 and parallel to the cylinder 7. An arm 78, journalled on the shaft 79, is connected with the roller 72 to hold it in position in the cam way 71.

A plate 54 may be placed on the bars 8 and over the pipe section 77 in case of operating with heavy sheets or where the influence of this vacuum pipe section is not required.

The cam 80, carried by the shaft 28, has therein a roller 81 which is connected by a link 82 with the arm 83 of the valve 84 in the vacuum pipe 85. The latter has the perforated section 86 extending parallel to the cylinder 7 and back of the fingers 87, in position for applying suction to the outer fold 3'' of the section carried by the cylinder 7, to supplement the force of gravity and centrifugal force in withdrawing such fold from the cylinder and opening the bight required for receiving the filling sheets. The fingers 87 are provided to limit the outward movement of or afford a guide for the fold 3'' as it moves outwardly and downwardly.

The shaft 22, which carries the cylinder 10, has fixed thereon the spur wheel 90 which engages the journalled spur wheel 91 having thereon the cam way 92. The roller 93 is engaged in this cam way and is carried by an arm 94 fixed on the journalled shaft 95. This shaft has fixed thereon the dogs or stops 96 which are oscillated thereby to engage the forward edges of the filling or stuffing sheets 5 and hold them back during a predetermined period of the operation, and disengage the same when it is desired to feed them forward in timed relation to the corresponding movements of the sheets 3.

The cylinder 10 carries the gripping fingers 55' which are rocked by the journals 56' through the actions of the segments 57' and 58' and the rod 59' under control of the arm 60' and roller 61' engaged in the cam way 62', the mechanism being similar to the gripping mechanism previously described. These fingers are designed to engage the sheets 5, when the dogs 96 are elevated, to carry such sheets between the cylinders 9 and 10 and the carrier belts 11 and 12 in properly timed relation, the fingers being automatically disengaged from the sheets when this has been effected.

The wheel 90 engages and drives a pinion 97 fixed on a journalled shaft 98 which carries the upper set of sheaves 13, by which the belts 11 are driven positively in timed relation to the positively driven belts 12 which pass over the cylinder 10 and sheaves 14.

An idler gear 99 connects the spur wheel 90 with the pinion 100 which is fixed on the shaft 101 having the upper set of sheaves 18 fixed thereon. The pinion 100 acts through an idler spur wheel 102 on a pinion 103 which is fixed on the shaft 104 having the lower set of sheaves 108 fixed thereon.

It will now be understood that in operation the folded section or sheets 3 are fed between the cylinders 6 and 7, upon the rise of the dogs 35, as the gripping fingers 63 approach the dogs and engage the forward corners at the ends of the hinge of such section. The valves 42 are now opened in succession, the valves 43 being closed, and vacuum is applied to the inner fold 3' of the section 3 to draw and hold the same smoothly against the cylinder, which, as it revolves forward, acts centrifugally upon the fold 3'' to move it outwardly. Thereupon the finger 55 engages the corresponding upper corner of the sheets 3', the opposite corner being held in place by suction and the mechanical or bowed relation of the inner sheets. As the cylinder continues to revolve, the action of gravity and centrifugal force upon the free fold 3'' is supplemented by suction due to the vacuum in the pipe section 86, and, as the fold 3'' advances farther, the action thereon of gravity and centrifugal force is supplemented by the suction due to the vacuum in the pipe section 77, which compels such fold to lie against the bars 8 with the full opening of the bight between the parts 3' and 3'' for receiving the advancing filling sheets 5.

In timed relation with the operation of the mechanism for handling the sheets 3, the dogs 96 are elevated and the fingers 55' engage the corners of the forward edge and hinge of the sheets 5, which are thereafter carried down between the belts 11 and 12, and between the belts 15 and 16, which latter shoot them between the open folds 3' and 3'' or into the dihedral angle formed thereby, as illustrated in Fig. 3.

It will be understood that while the gripping devices for holding the sheets to the cylinders and the suction devices for opening the bight between the main folds of the outer sheet may be required in dealing with certain kinds of papers, in other cases one or more of these features may be omitted. Hence it will be understood that variations may be made in the details of the construction without departing from my invention.

Having described my invention, I claim:

1. The method of inserting sheets between the folds of sheets, which consists in holding and revolving said sheets second named downwardly so that an outer fold thereof is deflected from the inner fold, and projecting the sheets first named between the separated folds.

2. The method of inserting paper sheets between the folds of paper sheets, which consists in holding, revolving, opening and closing said sheets second named, and projecting said sheets first named into the openings of said sheets second named during their revolving movement.

3. The method of inserting paper sheets between the folds of paper sheets, which consists in holding, revolving, opening by deflecting a fold, supporting the deflected fold, closing the deflected fold and releasing said sheets second named and projecting said sheets first named into the opening of said sheets second named during the movement and upon the supported deflected fold thereof.

4. The method of inserting paper sheets between the folds of paper sheets, which consists in pneumatically holding a fold of said sheets second named, centrifugally deflecting the outer fold thereof, supporting said outer fold, projecting said sheets first named between the separated folds, closing the deflected fold upon the filling sheets, and releasing the suction on said fold first named.

5. The method of inserting paper sheets between the folds of paper sheets, which consists in mechanically engaging folds of said sheets second named, centrifugally deflecting folds from the engaged folds, supporting the deflected folds, projecting said sheets first named between the separated folds, closing the separated folds, and releasing the engaged folds.

6. The mechanism for inserting paper sheets between folds of paper sheets, which comprises a revoluble cylinder having means for engaging folds of said sheets second named relatively thereto, whereby the outer folds of said sheets second named are centrifugally deflected from the engaged folds, means operating in synchronous relation with the revolution of said cylinder for projecting said sheets first named between the separated folds of said sheets second named, means for closing the deflected folds upon the inserted sheets, and means for effecting the release of the folds engaged to said cylinder.

7. The mechanism for inserting paper sheets between folds of paper sheets, which comprises a revoluble cylinder having co-operating pneumatic means whereby folds of said sheets second named are engaged and disengaged relatively to said cylinder at predetermined points in the revolution thereof, said cylinder adapted for centrifugally deflecting disengaged folds of said sheets second named in revolving the same between said points, means for supporting the deflected folds, and means comprising carrier belts for projecting said sheets first named between the separated folds of said sheets second named.

8. The mechanism for inserting paper sheets between folds of paper sheets, which comprises a revoluble cylinder having gripping means for engaging and disengaging folds of said sheets second named relatively to said cylinder at predetermined points in the revolution thereof, whereby complementary folds are deflected centrifugally therefrom, means for supporting the deflected folds and closing them between the engaging and disengaging operations of said gripping means, and means comprising a revolving cylinder for projecting said sheets first named between the separated folds of said sheets second named.

9. The mechanism for inserting paper sheets between connected complementary folds of paper sheets, which comprises a revoluble horizontal cylinder having peripheral apertures, means for exhausting inwardly through said apertures, and automatically operated means comprising a cam and valve mechanism operated thereby for controlling said exhausting means, whereby folds of said sheets second named are engaged to said cylinder, carried downwardly and the complementary folds are deflected outwardly, in combination with synchronously operating means for delivering said sheets first named between the folds pneumatically engaged to said cylinder and the deflected complementary folds.

10. The mechanism for inserting paper sheets between connected complementary folds of paper sheets, which comprises a revoluble horizontal cylinder provided with means comprising gripping devices for engaging folds of said sheets second named, stationary cam mechanism, means whereby said cam mechanism operates said gripping devices at predetermined points in the revolution of said cylinder between which said sheets second named are carried downwardly thereby, said cylinder deflecting the disengaged folds of said sheets second named during said downward movement, and means for inserting said sheets first named between the separated folds of said sheets second named.

In testimony whereof I have hereunto set my hand this 2nd day of August, 1921.

LOUIS TEAL.